United States Patent
Mills et al.

(10) Patent No.: US 6,896,089 B2
(45) Date of Patent: May 24, 2005

(54) STEER-BY-WIRE STEERING SYSTEM WITH ROTATION LIMITER

(75) Inventors: Aaron L. Mills, Ann Arbor, MI (US); Michael Patrick Lopez, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 09/683,703

(22) Filed: Feb. 5, 2002

(65) Prior Publication Data

US 2003/0146038 A1 Aug. 7, 2003

(51) Int. Cl.[7] .............................................. B62D 5/00
(52) U.S. Cl. ....................................... 180/402; 280/89
(58) Field of Search .............................. 180/402, 403; 280/89

(56) References Cited

U.S. PATENT DOCUMENTS

| | | | |
|---|---|---|---|
| 1,083,399 A | * | 1/1914 | Hanger, Jr. ............... 192/223.2 |
| 4,641,737 A | | 2/1987 | Gillingham et al. ........ 192/141 |
| 4,865,144 A | | 9/1989 | North ........................ 180/79.1 |
| 5,456,330 A | | 10/1995 | Kojima et al. ............. 180/79.1 |
| 5,803,202 A | | 9/1998 | Bohner et al. .............. 180/443 |
| 5,896,942 A | | 4/1999 | Bohner et al. .............. 180/402 |
| 6,481,526 B1 | * | 11/2002 | Millsap et al. .............. 180/402 |

FOREIGN PATENT DOCUMENTS

WO    WO 200240336 A1 *  5/2002   ............ B62D/1/16

* cited by examiner

*Primary Examiner*—Kevin Hurley
(74) *Attorney, Agent, or Firm*—Gregory P. Brown

(57) ABSTRACT

A steer-by-wire steering system 10 for steering road wheels 40A and 40B on a vehicle. The steering system 10 includes a steering wheel 12 rotatable by an operator to command steering of the steered road wheels 40A and 40B, and a steering input shaft 16 mechanically linked to the steering wheel 12. A housing structure 14 is disposed proximate the steering input shaft 16. A male member 46 is provided on the housing structure, and a female receptacle 50 is formed in the steering input shaft 16 for matingly receiving the male member 46. The female receptacle 50 comprises a pair of end walls 52 and 54 for limiting rotational travel of the steering wheel 12. The steering system 10 further has an actuator 26 for rotating the wheels 40A and 40B on the vehicle in response to rotation of the steering wheel 12.

20 Claims, 2 Drawing Sheets

STEER-BY-WIRE STEERING SYSTEM WITH ROTATION LIMITER

BACKGROUND OF INVENTION

The present invention generally relates to a vehicle steering system and, more particularly, relates to a steer-by-wire steering system in which there is no direct mechanical linkage between the hand-operated input (e.g., steering wheel) and the road wheels.

Steering of a wheeled motor vehicle is typically achieved by a vehicle operator (i.e., driver) rotating a hand-operated steering wheel that is arranged in the passenger compartment of the vehicle to command turning of the steerable road wheels. Conventional steering systems generally include a rack and pinion-type steering assembly operatively coupled to the steerable road wheels and a steering column coupled between the steering wheel and the rack and pinion assembly for converting angular rotational movement of the steering wheel into sliding movement on a linear actuator to effect turning of the road wheels. In the past, many vehicle steering systems commonly employed a direct mechanical linkage connected between the steering wheel and the rack and pinion assembly. When the steering wheel is rotated, the mechanical linkage transfers the rotational force to the rack and pinion assembly which, in turn, actuates the steerable road wheels to be turned left or right, typically with the assistance of hydraulic-powered or electric-powered assistance.

A more advanced steering system which has no direct mechanical linkage between the steering wheel and the steered road wheels is commonly referred to as a steer-by-wire steering system. Steer-by-wire steering systems that have been proposed and/or employed in automotive vehicles typically include a steering column having a rotatable steering wheel shaft mechanically connected to the driver actuated steering wheel and extending into a housing in the steering column. A feedback motor and an angular position sensor are coupled to the steering wheel shaft. The steer-by-wire steering system also employs a pinion shaft which is not mechanically linked to the steering wheel shaft. Instead, the pinion shaft is rotary driven by an actuator, such as an electric motor, typically in response to the sensed angular position of the steering wheel shaft, to actuate the rack and pinion assembly so as to turn the road wheels. In addition, a torque sensor is typically also positioned on the pinion shaft to sense torque which, in turn, is used to control the amount of feedback force applied to the steering wheel via the feedback motor.

Mechanically linked steering systems generally have road wheel travel turning limits which limit the rotational range of motion of the steering wheel. Typically, these rotary limits are imposed by the travel limits of the rack and pinion assembly which, in turn, prevents further rotation of the steering wheel due to the interconnecting mechanical linkage. In a steer-by-wire steering system, since there is no mechanical linkage between the steering wheel and the rack and pinion assembly, the rack and pinion assembly does not limit the rotational travel of the steering wheel. Thus, in some steer-by-wire steering systems the steering wheel may be rotated without rotational limitation. While it is conceivable that the feedback electric motor may be used to resist travel at predefined rotational limits, the use of the feedback motor to resist rotational movement would typically draw high current and thus consume electric power. Further, when electric power is shut off to the motor, no such steering wheel travel limits would be imposed by the motor.

Accordingly, it is desired to provide for a steer-by-wire steering system for a vehicle that limits the rotational travel of the driver commanded steering wheel.

SUMMARY OF INVENTION

In accordance with the teachings of the present invention, a steer-by-wire steering system for steering one or more steering members (e.g., road wheels) on a vehicle is provided. The steering system comprises a steering input device rotatable by an operator to command steering of one or more road wheels, and a rotatable steering input shaft mechanically connected to the steering input device. The steering input shaft rotates in response to rotation of the steering input device. A support member is disposed proximate to the steering input shaft. A male member is provided on one of the steering input shaft and the support member, and a female receptacle is provided on the other of the steering input shaft and the support member for receiving the male member. The female receptacle comprises at least one stop position for limiting rotational travel of the steering input shaft. The steering system further has an actuator for rotating one or more wheels on the vehicle in response to rotation of the steering input device.

According to another aspect of the present invention, a steering assembly for a steer-by-wire steering system for steering one or more road wheels on a vehicle is provided. The steering assembly comprises a steering input device rotatable by an operator for commanding steering of the one or more road wheels of the vehicle, and a rotatable steering input shaft mechanically connected to the steering input device and rotatable in response to rotation of the steering input device. A support member is disposed proximate to the steering input shaft. A male member is provided on one of the steering input shaft and the support member, and a female receptacle is provided on the other of the steering input shaft and the support member for receiving the male member. The female receptacle comprises at least one stop position for limiting rotational travel of the steering input shaft.

These and other features, advantages and objects of the present invention will be further understood and appreciated by those skilled in the art by reference to the following specification, claims and appended drawings.

BRIEF DESCRIPTION OF DRAWINGS

The present invention will now be described, by way of example, with reference to the accompanying drawings.

DETAILED DESCRIPTION

Figure 1:
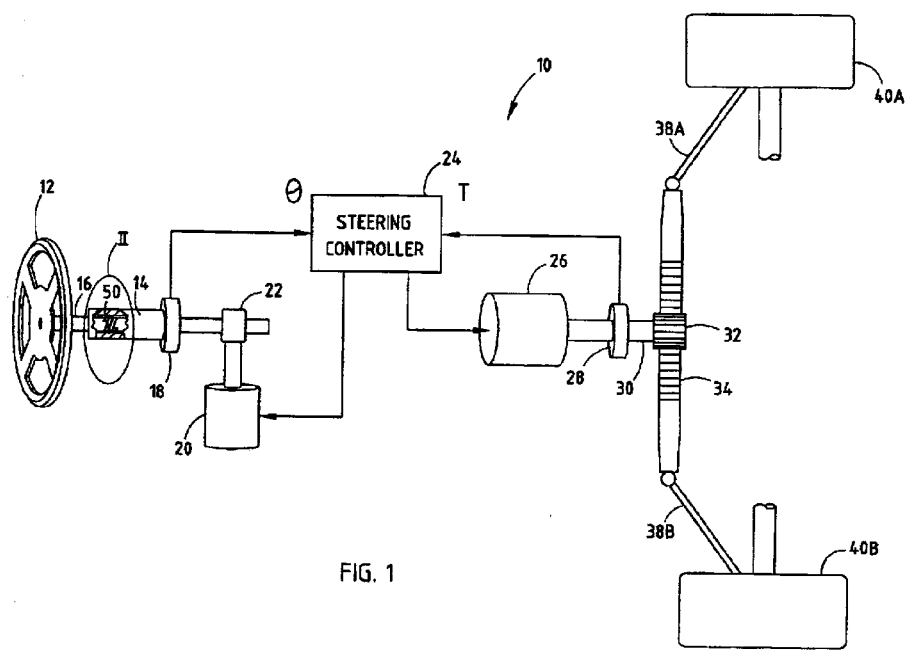
FIG. 1 is a diagrammatic view of a steer-by-wire steering system for a steered vehicle having a steering wheel rotary limit assembly according to the present invention.

Referring to FIG. 1, a steer-by-wire steering system 10 is illustrated for steering a steered vehicle, such as a wheeled automotive vehicle, and is equipped with a steering input rotary limit assembly which limits rotation of the rotary steering input according to the present invention. The steering system 10 is shown and described herein in connection with a steer-by-wire steering system for steering a pair of steerable road wheels 40A and 40B, such as the two front wheels of a vehicle, adapted to be engaged in friction contact with the ground, such as a roadway. However it should be appreciated that the steering system 10 of the present invention may be employed to steer any number (one or more) of front and/or rear steerable members of a steered vehicle.

The steer-by-wire steering system 10 has a steering wheel assembly including a hand-operated rotatable steering wheel (input) 12 that is rotatable, both clockwise and counterclockwise, by the driver of the vehicle to turn the road wheels 40A and 40B, right and left, respectively. The steering wheel assembly also includes a rotary steering wheel shaft 16 mechanically connected to the steering wheel 12. The steering wheel shaft 16 is rotatable directly in response to rotation of the steering wheel 12. Connected to the steering wheel shaft 16 via gear 22 is an electric feedback motor 20. The electric feedback motor 20 serves to provide feedback resistance force to the steering wheel 12, in response to detected resistance of the road wheels 40A and 40B, so that a recognizable steering feel is realized by the driver. Also coupled to steering wheel shaft 16 is a steering angle sensor 18 for sensing angular position θ of the steering wheel shaft 16.

The steer-by-wire steering system 10 further includes a rack and pinion assembly having a toothed rack 34, a pinion gear assembly 32, and a pinion shaft 30. The pinion gear assembly 32 is connected to one end of the pinion shaft 30 and engages the toothed rack 34. The pinion shaft 30 is not mechanically linked to the rotary shaft 16. The pinion shaft 30 is rotary driven by an actuator in the form of an electric drive motor 26 in response to a motor control output signal received from a steering controller 24. Accordingly, the pinion shaft 30 is rotary actuated in response to the control output signal generated by the steering controller 24, instead of employing a direct mechanical linkage between the steering wheel shaft 16 and pinion shaft 30.

The pinion shaft 30 is coupled at one end to the pinion gear assembly 32 for converting angular rotation of the pinion shaft 30 to linear movement on the rack 34. The rack 34 is connected on opposite ends to tie rods 38A and 38B which are movable to actuate the left and right turning of road wheels 40A and 40B. In addition, a torque sensor 28 monitors the torque applied to the pinion shaft 30 and provides a torque signal T as an input to the steering controller 24, so that the steering controller 24 can generate the feedback control signal for controlling the feedback motor 20. The pinion shaft 30, electric drive motor 26, torque sensor 28, steering controller 24, pinion gear assembly 32, rack 34, tie rods 38A and 38B, road wheels 40A and 40B, and other steering assembly components directly connected thereto may include conventional steering assembly components.

Figure 2:
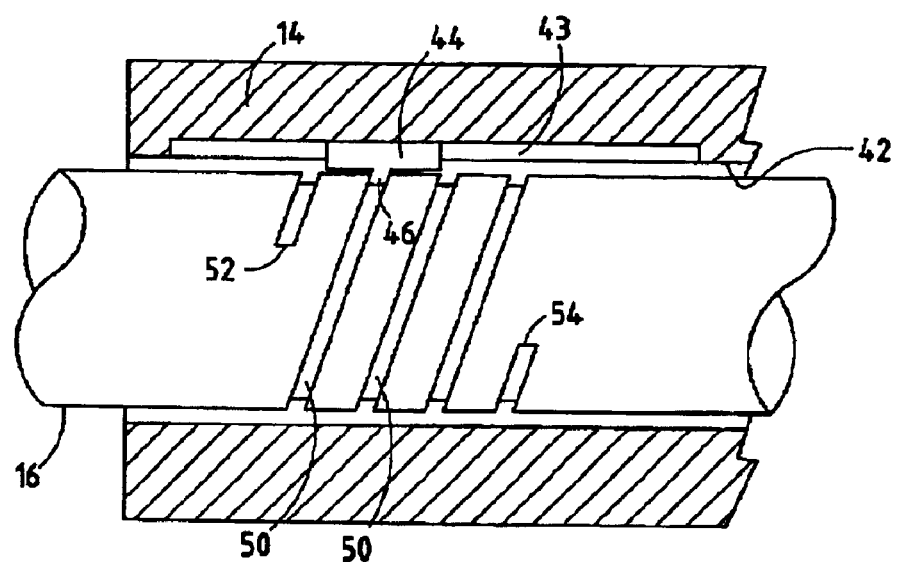
FIG. 2 is an enlarged sectional cutaway view of the steering wheel rotary limit assembly shown in FIG. 1.

As is more particularly shown in FIG. 2, the rotary shaft 16 and steering column housing 14 are configured with a steering wheel rotary limiter assembly to limit the rotary travel of the steering wheel 12 and steering wheel shaft 16 in both the clockwise and counterclockwise rotations to stop rotary movement at predetermined stop positions. The steering wheel shaft 16 has a female receptacle configured as a slot 50 formed therein and extending spirally a predetermined number of rotations about the circumference of the steering wheel shaft 16. The slot 50 is configured as a recessed channel in the shape of a spiral which extends axially along the steering wheel shaft 16 a predetermined number of turns. According to one example, the slot 50 extends for three complete (360 degree) turns to thereby limit rotary travel of the steering wheel 12 to three turns.

Disposed against the outer surface of steering wheel shaft 16 and extending into mating engagement with slot 50 is an axially slidable male member configured as a base slider 44 having a male member (pin) 46 which extends into slot 50 to cooperatively engage slot 50. The pin 46 may be provided on the slider 44 disposed within a slot 43 formed within a support member, such as the steering column housing 14, such that the male member is prevented from rotating, yet the slider 44 and pin 46 are able to traverse axially along the steering wheel shaft 16 such that the pin 44 remains in engagement with slot 50 as the steering wheel shaft 16 rotates.

Opposite ends of slot 50 are defined by first and second end walls 52 and 54 which serve as rotary stop positions which prevent further extending rotation of the steering wheel shaft 16. The pin 46 is able to travel within slot 50 until the pin 44 engages either of the end walls 52 and 54. The end walls 52 and 54 provide stop positions which limit the travel of the rotary shaft 16 and, thus, limit the rotational movement of the steering wheel 12. The end walls 52 and 54 thereby prevents the steering wheel 12 and steering wheel shaft 16 from exceeding established rotary limits. It should be appreciated that the rotary limits are preferably defined such that the pin 46 engages slot 50 midway between the first and second end walls 52 and 54 when the steering wheel 12 is oriented in a center position for driving the vehicle in the straightforward direction.

Accordingly, the steer-by-wire steering system 10 of the present invention advantageously provides for a mechanical steering limit assembly to limit the rotary travel of the steering wheel 12 and steering wheel shaft 16. The mechanical steering limit assembly of the present invention avoids a need for an electric motor generated locking force and, thus, avoids the drawbacks associated therewith. While the steer-by-wire steering system 10 has been described in connection with a steering system which employs an electric motor 26 for driving a pair of road wheels 40A and 40B, it should be appreciated that the teachings of the present invention may be applicable to steering systems which employ one or more independently steerable members. It should be also be appreciated that while the male member having a slider 44 and pin 46 is shown engaging a female receptacle (slot) 50 on the rotary shaft 16, the rotary shaft 16 may alternately be configured to include a male member projecting radially outward for engaging a female receptacle formed on a support member within or near the housing 14, without departing from the teachings of the present invention.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A steer-by-wire steering system for steering one or more road wheels on a vehicle, said steering system comprising:

a steering input device rotatable by an operator to command steering of the one or more road wheels;

a steering input shaft mechanically connected to the steering input device and rotatable in response to rotation of the steering input device, wherein the steering input shaft is not mechanically linked to the steered one or more road wheels;

a support member disposed proximate the steering input shaft;

a male member provided on one of the steering input shaft and the support member;

a female receptacle provided on the other of the steering input shaft and the support member for receiving the male member, wherein the female receptacle comprises at least one stop position for limiting rotational travel of the steering input shaft; and an actuator for rotating one or more wheels in the vehicle in response to rotation of the steering input device.

2. The steering system as defined in claim 1, wherein said female receptacle comprises a slot and said male member comprises a pin.

3. The steering system as defined in claim 2, wherein the slot is formed in the steering input shaft and the pin is provided on the support member.

4. A steer-by-wire steering system for steering one or more road wheels on a vehicle, said steering system comprising:

a steering input device rotatable by an operator to command steering of the one or more road wheels;

a steering input shaft mechanically connected to the steering input device and rotatable in response to rotation of the steering input device;

a support member disposed proximate the steering input shaft;

a male member provided on one of the steering input shaft and the support member;

a female receptacle provided on the other of the steering input shaft and the support member for receiving the male member, wherein the female receptacle comprises at least one stop position for limiting rotational travel of the steering input shaft;

an actuator for rotating one or more wheels in the vehicle in response to rotation of the steering input device; wherein said female receptacle comprises a slot and said male member comprises a pin; wherein the slot is formed in the steering input shaft and the pin is provided on the support member; and wherein the pin is slidable within the slot and the support member prevents rotation of the pin.

5. The steering system as defined in claim 1, wherein the support member comprises a steering column housing.

6. The steering system as defined in claim 1, wherein said steering input device comprises a steering wheel.

7. A steer-by-wire steering system for steering one or more road wheels on a vehicle, said steering system comprising:

a steering input device rotatable by an operator to command steering of the one or more road wheels;

a steering input shaft mechanically connected to the steering input device and rotatable in response to rotation of the steering input device;

a support member disposed proximate the steering input shaft;

a male member provided on one of the steering input shaft and the support member;

a female receptacle provided on the other of the steering input shaft and the support member for receiving the male member, wherein the female receptacle comprises at least one stop position for limiting rotational travel of the steering input shaft;

an actuator for rotating one or more wheels in the vehicle in response to rotation of the steering input device; and further comprising a pinion shaft coupled to the actuator, wherein the pinion shaft is not mechanically linked to the steering input shaft.

8. The steering system as defined in claim 7, wherein said actuator comprises an electric motor.

9. A steer-by-wire steering system for steering one or more steerable members on a steered vehicle, said steering system comprising:

a steering input device rotatable by an operator to command steering of the one or more steerable members;

a steering input shaft mechanically connected to the steering input device and rotatable in response to rotation of the steering input device, wherein the steering input shaft is not mechanically linked to the steered one or more steerable members;

a support member disposed proximate the steering input shaft;

a male member provided on one of the steering input shaft and the support member;

a female receptacle provided on the other of the steering input shaft and the support member for receiving the male member, wherein the female receptacle comprises at least one stop position for limiting rotational travel of the steering input shaft; and an actuator for actuating one or more steerable members in the vehicle in response to rotation of the steering input device.

10. The steering system as defined in claim 9, wherein said female receptacle comprises a slot and said male member comprises a pin.

11. The steering system as defined in claim 10, wherein the slot is formed in the steering input shaft and the pin is provided on the support member.

12. The steering system as defined in claim 9, wherein the support member comprises a steering column housing.

13. A steer-by-wire steering system for steering one or more steerable members on a steered vehicle, said steering system comprising:

a steering input device rotatable by an operator to command steering of the one or more steerable members;

a steering input shaft mechanically connected to the steering input device and rotatable in response to rotation of the steering input device;

a support member disposed proximate the steering input shaft;

a male member provided on one of the steering input shaft and the support member;

a female receptacle provided on the other of the steering input shaft and the support member for receiving the male member, wherein the female receptacle comprises at least one stop position for limiting rotational travel of the steering input shaft;

an actuator for actuating one or more steerable members in the vehicle in response to rotation of the steering input device; wherein the support member comprises a steering column housing; and wherein the male member is axially slidable in a channel formed in the housing and the channel prevents the male member from rotating.

14. The steering system as defined in claim 9, wherein said steering input device comprises a steering wheel.

15. The steering system as defined in claim 9, wherein the one or more steerable members comprise one or more road wheels.

16. A steering assembly for a steer-by-wire steering system for steering one or more road wheels of a vehicle, said steering assembly comprising:

a steering input device rotatable by an operator to command steering of one or more road wheels of the vehicle;

a steering input shaft mechanically connected to the steering input device and rotatable in response to rotation of the steering input device, wherein the steering input shaft is not mechanically linked to the steered one or more road wheels;

a support member disposed proximate the steering input shaft;

a male member provided on one of the steering input shaft and the support member; and a female receptacle provided on the other of the steering input shaft and the support member for receiving the male member, wherein the female receptacle comprises at least one stop position for limiting rotational travel of the steering input shaft.

17. The steering assembly as defined in claim 16, wherein said female receptacle comprises a slot and said male member comprises a pin.

18. The steering assembly as defined in claim 16, wherein the slot is formed in the steering input shaft and the pin is provided on the support member.

19. A steering assembly for a steer-by-wire steering system for steering one or more road wheels of a vehicle, said steering assembly comprising:

a steering input device rotatable by an operator to command steering of one or more road wheels of the vehicle;

a steering input shaft mechanically connected to the steering input device and rotatable in response to rotation of the steering input device;

a support member disposed proximate the steering input shaft;

a male member provided on one of the steering input shaft and the support member;

a female receptacle provided on the other of the steering input shaft and the support member for receiving the male member, wherein the female receptacle comprises at least one stop position for limiting rotational travel of the steering input shaft; and wherein the support member comprises a steering column housing having a slot for retaining the male member so as to prevent rotation of the male member while allowing the male member to slide within the female receptacle.

20. The steering assembly as defined in claim 16, wherein said steering input comprises a steering wheel.

* * * * *